UNITED STATES PATENT OFFICE.

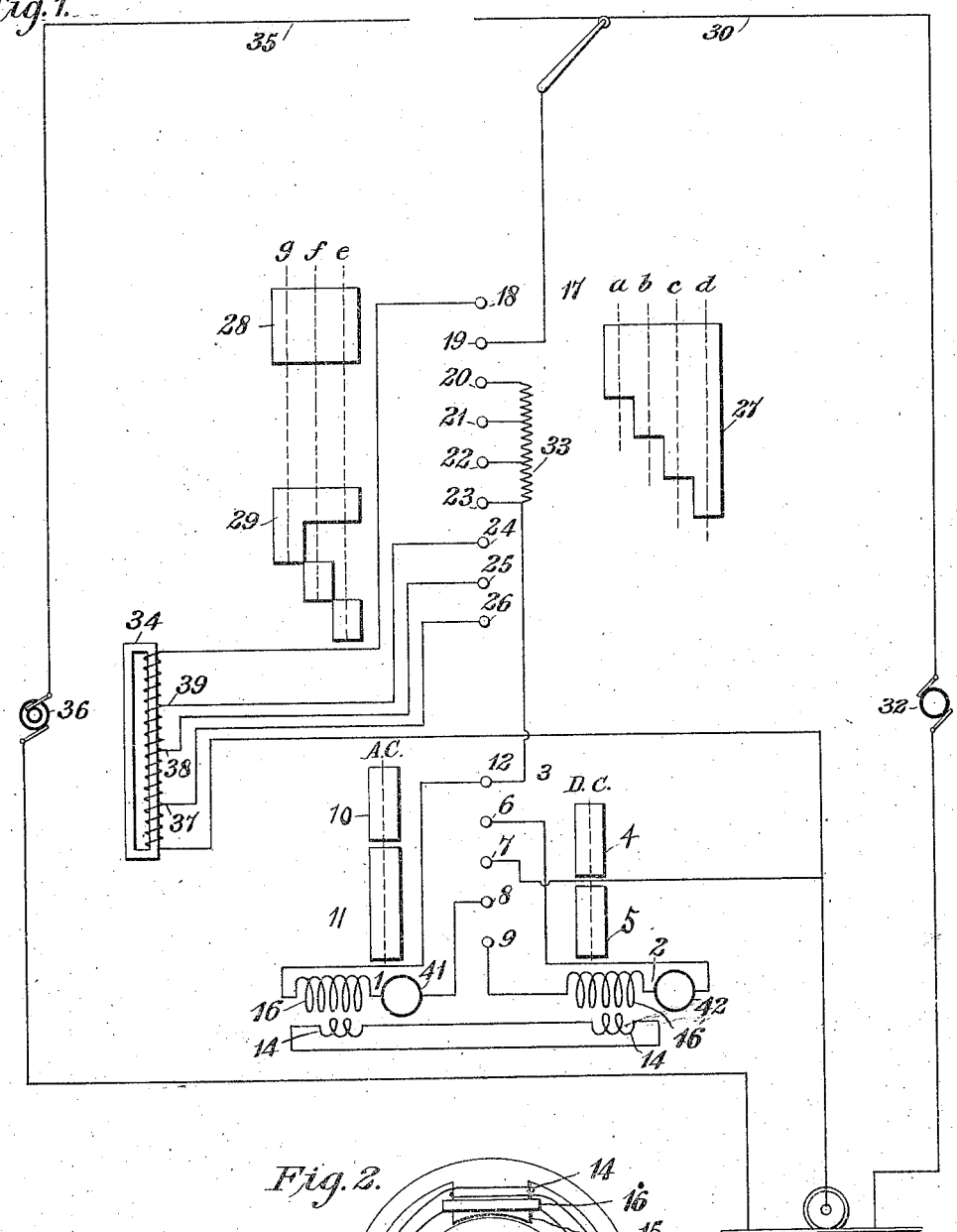

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

CONTROLLING SYSTEM FOR ELECTRIC MOTORS.

No. 900,555.  Specification of Letters Patent.  Patented Oct. 6, 1908.

Original application filed December 4, 1905, Serial No. 290,122. Divided and this application filed February 24, 1908. Serial No. 417,367.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Controlling Systems for Electric Motors, of which the following is a specification, this application being a division of my application Serial No. 290,122, filed December 4, 1905.

My invention relates to electric motors that are adapted to be operated by either direct or alternating currents, and to systems of control therefor.

The object of my invention is to provide improved means whereby the occurrence of excessive induced voltages in the motor circuits, upon interruption thereof, may be effectually prevented.

It is well known to those skilled in the art that, upon the interruption of the circuit of an electric motor, a very high induced voltage often exists momentarily in the circuit as a result of the sudden reduction in the magnetism of the field, and oftentimes this is sufficient to cause a disruptive discharge through the insulation, after which serious injury may occur to the motor when it is again connected to the supply circuit. The induced voltage is directly proportional to the rapidity with which the circuit is interrupted, the total change in the magnetic flux and the total number of turns through which this flux changes. If one or more closed circuit conducting paths surround the magnetic circuit, the difference of potential will be reduced, because such paths serve as secondary circuits and retard the rate of change of the magnetic flux. In motors of ordinary construction, the above-mentioned closed circuits may be provided by the solid material of the field magnet poles or yoke or by the devices which secure the field magnet windings upon the polar projections, or they may be provided by the armature coil or coils, the terminals of which are connected together at the instant of commutation. The effectiveness of this latter path as a secondary circuit for retarding the rate of change of the flux usually depends upon the resistance of the brushes and the character and extent of the contact which they make with the commutator cylinder.

In motors of the commutator type that are adapted to be operated by alternating currents, low resistance closed circuit paths are avoided as far as possible, because the entire magnetic flux changes at a very rapid rate. While these motors are usually provided with field magnet windings having only a very few turns, in order that the ratio of field ampere turns to armature ampere turns may be low, and while they are so designed in other respects as to have but relatively low total induction, still the momentary rise in the voltage upon suddenly interrupting the circuits may amount to two or more times the normal voltage. The rise in voltage upon interrupting the circuit of a single motor may not cause injury thereto, but if the motors are connected in series and the circuit is interrupted only at the terminals of the series, the rise in voltage may be excessive and cause a disruptive discharge to occur through the insulation of the circuit. The alternating voltage upon which these motors are adapted to operate best is low as compared with that which usually occurs upon the distributing circuit. When the motors are operated by alternating currents, they are usually connected in parallel and the high voltage of the distributing circuit is changed to the low voltage required by the motors by means of transformers; but when they are operated by direct currents, they are generally connected in series to receive the full voltage of the distributing circuit, because of the impracticability of reducing such voltage. It follows, therefore, as hereinbefore stated, that under these conditions it is very desirable to employ some means for reducing the voltage which is induced upon interruption of the circuit.

Figure 1 of the accompanying drawings illustrates, diagrammatically, a system of control embodying my invention, and Fig. 2 is a view, in end elevation, of a motor constructed in accordance with my invention.

The circuit relations of a pair of motors 1 and 2 may be adjusted by means of a change-over switch 3, the conducting segments 4 and 5 of which engage contact terminals 6, 7, 8 and 9 when the motors are operated by direct currents and the conducting segments 10 and 11 of which engage contact terminals 12, 6, 7, 8 and 9 when the motors are operated by alternating currents, the motors being connected in series relation in the former case and in parallel relation in the latter. The motors 1 and 2 are provided with auxiliary windings 14 that are preferably placed upon the field magnet polar projections 15 beside the main exciting coils 16, as indicated in Fig. 2. The circuits of the motors may be further adjusted by means of a controller 17 comprising a plurality of stationary contact fingers 18 to 26, inclusive, and conducting segments 27, 28 and 29 that may be moved into engagement therewith. The segment 27, when moved through the positions indicated by the broken lines $a$, $b$, $c$ and $d$, serves to connect the motors between a trolley conductor 30 and a track rail 31 supplied with direct current energy from any suitable source, such as that shown at 32, and also to vary the amount of a resistance 33 included in circuit with the motors. When the conducting segments 28 and 29 are moved through the positions indicated by the broken lines $e$, $f$ and $g$, a transformer 34, supplied with alternating currents from any suitable source, such as that shown at 36, is connected between a trolley conductor 35 and the track rail 31, and one terminal of the motor is connected to one or another of leads 37, 38 and 39 from the transformer 34, whereby the voltage applied to the motor circuits may be varied.

It will be readily understood from the foregoing description that when it is desired to operate by direct currents, the change-over switch 3 will first be moved to the position indicated by the broken line D—C and then the controller 17 will be moved to the position $a$, a circuit being thereby established from trolley conductor 30, through conducting segment 27, resistance 33, motor 1, conducting segment 4 and motor 2, to the track rail 31, the motors being then connected in series. The resistance 33 may then be removed gradually from the circuits of the motors by moving the conducting segment 27 through the succeeding positions. Upon returning the controller 17 to its "off" position, a high induced voltage in the circuits of the motors 1 and 2 is prevented because the auxiliary windings 14 are connected to form a secondary closed circuit which retards the rate of change of the magnetic flux. The arrangements of the circuits, when operating by alternating currents, will be readily understood from the foregoing description and an inspection of the drawing.

The auxiliary field magnet windings 14 of motors 1 and 2 are connected permanently in a closed circuit, the change-over switch 3 serving to adjust the circuit relations of the motors in such a manner that, upon disconnecting them from the direct current supply circuit, the currents induced in the windings 14 will traverse the closed circuit in the same direction, and so that, when operated by alternating currents, the induced currents in the windings 14 will traverse the closed circuit in opposite directions. When the motors are operated by direct currents, the contact segments 4 and 5 of the change-over switch engage the corresponding contact fingers and the circuit thus established includes the motor 1, the conducting segment 5, the motor 2 and the conducting segment 4. The induced electromotive forces in the windings 14 are then added and the currents traverse the closed circuit in the same direction. When the motors are operated by alternating currents, the fingers engage the contact segments 10 and 11 and the circuit includes the conducting segment 10, the motors 1 and 2 in parallel relation and conducting segment 11, it being observed that the current first traverses field magnet winding 16 of the motor 1 and then its armature 41, while it traverses the armature 42 of the motor 2 before traversing its field magnet winding 16. The induced electromotive forces in the auxiliary windings 14 will then oppose each other and the closed circuit, therefore, becomes ineffective as a secondary circuit when the motors are operated by alternating currents.

It will be understood from what has been shown and described that the field magnet polar projections of a single motor may be provided with auxiliary windings or that more than two motors may be employed, the auxiliary field magnet windings of which may be connected in pairs or groups in closed-circuit in a manner similar to that shown in Fig. 2.

I claim as my invention:

1. The combination with a source of direct currents, a source of alternating currents, a plurality of electric motors adapted to be operated by either character of energy and provided with auxiliary field magnet windings connected in closed circuit, of means for arranging the circuit relations of the motors in accordance with the character of energy supplied thereto and so that induced currents in the respective auxiliary field magnet windings may traverse the closed circuit in the same direction when operating by direct currents and in opposite directions when operating by alternating currents.

2. The combination with a source of direct currents, a source of alternating currents, a plurality of electric motors adapted to be operated by either character of energy and provided with auxiliary field magnet windings connected in closed circuit, of means for so connecting the motors in series relation when operated by direct currents and in parallel relation when operated by alternating currents that the induced electromotive forces in the respective auxiliary field magnet windings may be added in the first case and may oppose each other in the second case.

3. The combination with a source of direct currents, a source of alternating currents, a plurality of electric motors adapted to be operated by either character of energy and provided with auxiliary field magnet windings connected in closed circuit, of means for so connecting the motors in series relation when operated by direct currents and in parallel relation when operated by alternating currents that the induced currents in the respective auxiliary field magnet windings may traverse the closed circuit in the same direction for direct current operation and in opposite directions for alternating current operation.

In testimony whereof, I have hereunto subscribed my name this 21st day of February, 1908.

BENJ. G. LAMME.

Witnesses:
ELIZABETH LIVINGSTONE,
BIRNEY HINES.